Patented Feb. 10, 1948

2,435,631

UNITED STATES PATENT OFFICE 2,435,631

AUTOCONDENSATION PRODUCT OF AN ACID AMIDE

Eugene Lieber, West New Brighton, Staten Island, N. Y., assignor to Standard Oil Development Company, a corporation of Delaware No Drawing. Application September 26, 1942, Serial No. 459,754

16 Claims. (Cl. 252—51)

This invention relates to a novel type of chemical polymerization product and to methods of preparing such products and using them for various purposes, more particularly as pour depressors in waxy lubricating oils.

Broadly, the invention comprises the production of wax-modifying agents by polymerization or auto-condensation of an organic acid amide. The organic acid amide to be used is preferably one having the general formula R—CO—NH$_2$, in which R is a hydrocarbon radical which may be either aliphatic, aliphatic-aromatic or naphthenic, or a substituted derivative thereof. If R is aliphatic, it should preferably contain more than 2 carbon atoms, and preferably still more than 10 carbon atoms, and although saturated aliphatic groups are preferred in general, some olefinic radicals may be used, especially if they have relatively long carbon chains. In the above-mentioned formula, R may also be a naphthenic hydrocarbon, such as derived from various petroleum naphthenic acids, e. g., those obtained from petroleum fractions boiling above about 300° F., e. g., kerosene, gas oil, and light lubricating oil fractions.

Specific examples of acid amides which may be used, include the amides derived from stearic acid, palmitic acid, arachidic acid, lauric and myristic acid, aryl-fatty acids, e. g., phenyl stearic acid (made by condensing oleic acid with benzene in the presence of AlCl$_3$), hydroxy phenyl stearic acid (made by condensing oleic acid with phenol in the presence of AlCl$_3$), and synthetic fatty acids such as those derived by the oxidation of paraffin wax, or those derived from various natural glycerides, such as fatty oils or waxes, as for instance, cocoanut oil acids, hydrogenated fish oil acids, etc. Oleic acid is an example of an unsaturated aliphatic acid and butyric and valeric are examples of lower aliphatic acids of which the corresponding amides may be used, although the longer chain compounds are preferred.

The polymerization of the above-described acid amides is preferably carried out in the presence of a suitable catalyst, such as aluminum chloride, zinc chloride, boron chloride, or other Friedel-Craft catalysts, or other catalysts tending to promote auto-condensation type of polymerization reaction, such as the chlorides of phosphorus or sulfur, or phosphorus pentasulfide, or even elemental phosphorus or sulfur. Of these various catalysts those of the Friedel-Craft type are preferred, especially aluminum chloride due to its efficiency. The amount of catalyst to be used may vary over a fairly wide range, as for instance, about 10–150% based on the weight of the acid amide, and usually about 30–120% by weight.

The reaction is preferably carried out in the presence of an inert solvent which may be a refined heavy naphtha or kerosene, but it is preferably a halogenated aliphatic hydrocarbon solvent having preferably less than 4 carbon atoms and more than 2 halogen atoms, such as tetrachlorethane, trichloroethane, pentachlorethane, of which tetrachlorethane has been found to give very excellent results. Dichlorbenzene and other halogenated aromatic hydrocarbon solvents may be used, as well as mixtures of various solvents of the various types mentioned above. If an inert solvent is used, generally the amount thereof should not be more than 20 times the weight of the acid amide used, and preferably it should be about 3 to 10 times the weight of the amide used.

The polymerization reaction may be carried out at various temperatures ranging from about room temperature up to about 500° F., but is preferably carried out in the range of about 200°–400° F., with a reaction time ranging from about ¼ to about 20 hours, generally about 1 to 5 hours.

In carrying out the invention, a suitable procedure is to dissolve or suspend the organic acid amide in the inert solvent, and then to add the catalyst slowly thereto at room or slightly elevated temperature, and then after the addition of the catalyst, the temperature of the entire mixture may be raised and maintained until the reaction has been completed. On the other hand, if desired, the mixture of amide and solvent may be heated to reaction temperature before addition of the catalyst, and as a still further alternative, the catalyst may be first suspended in the inert solvent, and then the amide added thereto at the desired reaction temperature.

After the reaction has been completed, the catalyst should be removed from the reaction product, which in the case of a Friedel-Craft catalyst, such as aluminum chloride, is accomplished by hydrolyzing or otherwise neutralizing the halide catalyst by water, aqueous caustic soda, or alcohol, or any mixture of these or other suitable hydrolyzing liquid. The products are then settled or centrifuged in order to separate the catalyst layer from the organic layer containing the desired polymerization products, and then the latter is subjected to distillation under reduced pressure such as steam distillation or vacuum distillation, equivalent to distillation up to about 600° F. under an absolute pressure of about 1–5 millimeters mercury, preferably about 5–20 millimeters mercury. This distillation will remove overhead the inert solvent, if one was used, together with unreacted raw material, i. e., organic amide, as well as any relatively low boiling polymerization product, and will leave the desired product as distillation residue.

This product is a relatively high molecular weight polymerization product, having a molecular weight above about 600, probably about 900 to 1600, and is usually a heavy oil or a waxy or resinous solid, is soluble in mineral hydrocarbon oils, is generally brown in color and has the property of modifying the crystal structure of wax in various compositions containing the same when added thereto in small amounts. For instance, when about 0.5% to 10.0%, preferably about 1% to 5%, of this wax modifier is added to a waxy lubricating oil, such as the Pennsylvania type lubricating oil having a relatively high pour point, the resultant blend will have a substantially lower pour point; in other words, this wax modifier is an effective pour depressor for waxy oil. A small amount of this wax modifier is also useful as a dewaxing aid for removing wax from mineral lubricating oils of undesirably high wax content. In similarly small amounts, this wax modifier may also be incorporated into paraffin or compositions containing the same, to be used for various purposes, such as for coating or impregnating paper, etc., or for making various molded products.

For the sake of illustration, but without intending to limit the invention to the particular materials used, the following experimental data are given:

A series of tests were made in which the materials used and the results obtained are shown in the table below. In each of these tests 50 grams of the amide indicated were used, and 500 cc. of the solvent indicated were used. The pour point data were obtained on 2% and 5% blends of the polymerization product in a paraffinic lubricating oil base stock having a pour point of +30° F. In all cases the polymerization product was recovered by fire and steam distillation up to 600° F. In all of these tests the acid amide used was first dissolved in the solvent and then the aluminum chloride was added. The total quantity AlCl₃ was added at room temperature, then the reaction mixture was brought up to the desired reaction temperature.

acids such as the cocoanut oil acids of test No. 6 and the petroleum naphthenic acids of test No. 7, which later had a neutralization value of 233 mg. koh/gm. In each case the organic acid, i. e., the cocoanut oil acid or the petroleum naphthenic acid, and $PCl_3$ were placed in an Erlenmeyer flash equipped with a $CaCl_2$ tube and warmed on a water-bath for about ½ hour at 170–180° F.

The organic acid chloride (after decanting from phosphorous acid) was then added slowly to ammonia water containing an excess of $NH_3$ required to react. The ammonia water was stirred and the temperature kept below 50° F. The resulting precipitated amide was then separated by filtration on a Buchner funnel and washed with water to remove the $NH_3$.

The amide was dried by suspending in benzol and distilling off the water by azeotropic distillation.

The following table gives the quantities of materials used and the amount of amide formed:

| Acid | Cocoanut Oil Fatty Acids | Naphthenic Acids |
|---|---|---|
| Gms. Acid | 60 | 60 |
| Gms. $PCl_3$ | 26 | 22 |
| Gms. Product (amide) | 55 | 55 |

It is not intended that this invention be limited to any of the specific examples which were given merely for the sake of illustration nor unnecessarily to any theory as to the mechanism of the operation of the invention, but only by the appended claims.

I claim:

1. A relatively high molecular weight auto-condensation product of an acid amide having the general formula R—CO—$NH_2$, in which R is a hydrocarbon group selected from the class consisting of saturated aliphatic hydrocarbon groups having more than 2 carbon atoms, aliphatic ole-

TABLE

*Pour depressants by condensation of amides*

| Test No. | Reagents | | | Reaction | | Product | | | Color, etc. |
|---|---|---|---|---|---|---|---|---|---|
| | Amide Derived From Acid Reacted | Gms. AlCl₃ | Solvent | Temp. | Time, Hrs. | Gms. Yield [2] | A. S. T. M. Pour Test [1] | | |
| | | | | | | | 2.0% | 5.0% | |
| 1 | Stearic | 30 | Kerosene | 390° F | 5 | 27 | +5 | +15 | Brown wax. |
| 2 | do | 30 | Dichlorbenzene | Reflux [3] | 3½ | 51 | 0 | −10 | Do. |
| 3 | do | 30 | Tetrachlorethane | Reflux [4] | 3½ | 31 | −20 | −20 | Do. |
| 4 | do | 60 | Kerosene | 300 | 3½ | 64 | +5 | −10 | Brown oil. |
| 5 | Oleic | 60 | do | 300 | 3½ | 46 | +5 | −5 | Do. |
| 6 | Cocoanut oil | 60 | do | 300 | 3½ | 48 | +5 | −10 | Soft brown resin. |
| 7 | Petroleum naphthenic | 60 | do | 300 | 3½ | 61 | +15 | 0 | Do. |

[1] The pour test of the test oil is +30° F.
[2] By fire and steam distillation to 600° F.
[3] 355° F.
[4] 292° F.

It is noted from the above table that in all of the tests, the polymerization products had very substantial pour-depressing properties. It is especially noted that a very potent pour depressor was produced in test No. 3 in which tetrachlorethane was used as solvent, so that it is apparent that the nature of the solvent used has a distinct effect on the reaction.

Although the preparation of the acid amide used as raw material is not believed to have any part in the invention, it is described for the sake of clearness and completeness, particularly in regard to the preparation of the amides of mixed finic radicals having carbon chains of more than 10 carbon atoms, mixed aromatic-aliphatic hydrocarbon groups and naphthenic hydrocarbon groups, said condensation product having a molecular weight of about 600 to 1600.

2. A product consisting of an auto-condensation product of a saturated aliphatic acid amide having more than 10 carbon atoms, said product being soluble in hydrocarbon oils and substantially non-volatile up to about 600° F. under reduced pressure equivalent to an absolute pressure at least as low as 50 mm. mercury, and said product having a molecular weight of about 600 to 1600 and having the property of reducing the pour point of waxy mineral lubricating oils when added thereto in small amounts.

3. A product consisting of an auto-condensation product of stearyl amide, having a molecular weight of about 900 to 1600.

4. A product consisting of an oil-soluble auto-condensation product having a molecular weight of about 900 to 1600, of a higher fatty acid amide.

5. The process which consists essentially in auto-condensing an acid amide having the general formula R—CO—NH$_2$, in which R is a hydrocarbon group selected from the class consisting of saturated aliphatic hydrocarbon groups having more than 2 carbon atoms, aliphatic olefinic radicals having carbon chains of more than 10 carbon atoms, mixed aromatic-aliphatic hydrocarbon groups and naphthenic hydrocarbon groups, and distilling the auto-condensation products under reduced pressure substantially equivalent to distillation up to 600° F. under an absolute pressure at least as low as 50 mm. mercury, to obtain the desired auto-condensation product having a molecular weight of about 600 to 1600 as distillation residue.

6. The process which consists essentially in auto-condensing an acid amide having the general formula R—CO—NH$_2$, in which R is an aliphatic olefinic hydrocarbon group having more than 10 carbon atoms, with a Friedel-Craft catalyst at a temperature between the approximate limits of room temperature and 500° F., hydrolyzing and removing the catalyst and distilling the auto-condensation products under reduced pressure substantially equivalent to distillation up to 600° F. under an absolute pressure at least as low as 50 mm. mercury, to obtain as distillation residue a high molecular weight auto-condensation product having pour-depressing properties.

7. Process according to claim 6 carried out in the presence of an inert solvent.

8. The process which consists essentially in auto-condensing an acid amide having the general formula R—CO—NH$_2$, in which R is a saturated aliphatic hydrocarbon group having more than 2 carbon atoms, in the presence of aluminum chloride as polymerization catalyst, at a temperature between the approximate limits of room temperature and 500° F., and in the presence of a solvent selected from the class consisting of halogenated aliphatic hydrocarbons having less than 4 carbon atoms and having more than 2 halogen atoms, hydrolyzing and removing the catalyst and distilling the auto-condensation products under reduced pressure substantially equivalent to distillation up to 600° F. under an absolute pressure at least as low as 50 mm. mercury, to obtain the desired relatively high molecular weight auto-condensation product as distillation residue.

9. The process which consists essentially in auto-condensing stearyl amide with about 30–120% by weight of aluminum chloride to about 200° to 400° F. in the presence of tetrachlorethane, the amount of the latter being about 3 to 10 times the weight of the amide, refluxing the mixture for about 1 to 5 hours, hydrolyzing and removing the catalyst and distilling the auto-condensation products by fire and steam distillation to about 600° F. to obtain the desired relatively high molecular weight product as distillation residue.

10. A composition comprising wax and a small amount of an auto-condensation product of an acid amide having the general formula R—CO—NH$_2$, in which R is a hydrocarbon group selected from the class consisting of saturated aliphatic hydrocarbon groups having more than 2 carbon atoms, aliphatic olefinic radicals having carbon chains of more than 10 carbon atoms, mixed aromatic-aliphatic and naphthenic, said auto-condensation product having a molecular weight of about 600 to 1600.

11. A composition comprising a major proportion of a hydrocarbon oil, a small amount of wax and a small amount of the auto-condensation product of an acid amide having the general formula R—CO—NH$_2$, in which R is an aliphatic hydrocarbon group having more than 10 carbon atoms, said auto-condensation product having a molecular weight of about 900 to 1600.

12. A composition comprising a major proportion of waxy mineral lubricating oil and dissolved therein a small amount of an auto-condensation product of a higher fatty acid amide, said product being soluble in hydrocarbon oils and substantially non-volatile up to about 600° F. under reduced pressure equivalent to an absolute pressure at least as low as 50 mm. mercury, and said product having a molecular weight of about 900 to 1600 and having the property of reducing the pour point of waxy mineral lubricating oils when added thereto in small amounts.

13. A composition comprising a major proportion of waxy lubricating oil and dissolved therein a small amount of a pour depressor which comprises essentially an auto-condensation product of stearyl amide having a molecular weight of about 900 to 1600.

14. A composition comprising a major proportion of waxy mineral lubricating oil and dissolved therein a small amount of a high molecular weight oil soluble pour depressor made by auto-condensing a fatty acid amide having the general formula R—CO—NH$_2$ in which R is an aliphatic hydrocarbon group having at least 10 carbon atoms with a Friedel-Craft catalyst at a temperature between the approximate limits of room temperature and 500° F., hydrolyzing and removing the catalyst and distilling the auto-condensation products under reduced pressure substantially equivalent to distillation up to 600° F. under an absolute pressure at least as low as 50 mm. mercury, to obtain as distillation residue a high molecular weight auto-condensation product having a molecular weight from about 600 to 1600 and having pour-depressing properties.

15. A composition comprising a major proportion of waxy mineral lubricating oil and dissolved therein a small amount of a high molecular weight oil soluble pour depressor made by auto-condensing an acid amide having the general formula R—CO—NH$_2$, in which R is a hydrocarbon group selected from the class consisting of saturated aliphatic hydrocarbon groups having more than 2 carbon atoms, in the presence of aluminum chloride as auto-condensation catalyst, at a temperature between the approximate limits of room temperature and 500° F., and in the presence of a solvent selected from the class consisting of halogenated aliphatic hydrocarbons having less than 4 carbon atoms and having more than 2 halogen atoms, hydrolyzing and removing the catalyst and distilling the auto-condensation products under reduced pressure substantially equivalent to distillation up to 600° F. under an absolute pressure at least as low as 50 mm. mercury, to obtain the desired auto-condensation product having a molecular weight of about 900 to 1600 as distillation residue.

16. A composition comprising a major proportion of waxy mineral lubricating oil and dissolved therein a pour-depressing amount of an auto-condensation product having a molecular weight of about 900 to 1600 of stearyl amide substantially non-volatile up to 600° F. under reduced pressure substantially equivalent to absolute pressure at least as low as 50 mm. mercury, and derived by auto-condensation of stearyl amide in the presence of aluminum chloride and tetrachlorethane at about 200° to 400° F.

EUGENE LIEBER.

REFERENCES CITED

The following references are of record in the file of this patent:

UNITED STATES PATENTS

| Number | Name | Date |
|---|---|---|
| 2,291,396 | Lieber | July 28, 1942 |
| 2,104,796 | Dietrich | Jan. 11, 1938 |
| 2,245,129 | Greenewalt | June 10, 1941 |
| 2,174,527 | Peterson | Oct. 3, 1939 |
| 2,300,126 | Lieber | Oct. 27, 1942 |
| 2,312,966 | Hanford | Mar. 2, 1943 |
| 2,320,644 | Nill | June 1, 1943 |
| 2,216,812 | Flint | Oct. 8, 1940 |
| 1,937,463 | Nill | Nov. 28, 1933 |
| 1,037,158 | Lilienfeld | Aug. 27, 1912 |

OTHER REFERENCES

Zelinskii, Chemical Abstracts, vol. 22, 1928, page 2920.